United States Patent [19]

Hara et al.

[11] Patent Number: 5,184,300
[45] Date of Patent: Feb. 2, 1993

[54] CONTROL APPARATUS FOR A VEHICLE FOR CONTROLLING A DEVICE MOUNTED THEREON

[75] Inventors: Toshiro Hara; Yoshimasa Sato; Noboru Yagi, all of Himeji, Japan

[73] Assignee: Mitsubishi Denki Kabushiki Kaisha, Tokyo, Japan

[21] Appl. No.: 654,984

[22] Filed: Feb. 14, 1991

[30] Foreign Application Priority Data

Mar. 12, 1990 [JP] Japan .................................. 2-61574

[51] Int. Cl.$^5$ ............................................. G05B 15/00
[52] U.S. Cl. .................... 364/431.1; 364/431.11; 123/479
[58] Field of Search ............ 364/424.03, 431.01, 364/431.1, 431.11; 123/479, 491

[56] References Cited

U.S. PATENT DOCUMENTS

| | | | |
|---|---|---|---|
| 4,310,888 | 1/1982 | Furuhashi et al. | 364/431.10 |
| 4,577,605 | 3/1986 | Arnold et al. | 123/479 |
| 4,739,469 | 4/1988 | Oshiage et al. | 364/187 |
| 4,748,566 | 5/1988 | Sasaki et al. | 364/431.11 |
| 4,888,697 | 12/1989 | Hemminger et al. | 364/431.11 |
| 4,892,073 | 1/1990 | Yamamoto et al. | 123/417 |
| 4,951,210 | 8/1980 | Fukami | 364/431.11 |
| 4,989,569 | 2/1991 | Eidler | 123/479 |
| 5,095,438 | 3/1992 | Sasaki | 364/431.11 |

Primary Examiner—Thomas G. Black
Attorney, Agent, or Firm—Sughrue, Mion, Zinn, Macpeak & Seas

[57] ABSTRACT

A vehicle control apparatus prevents an unnecessary operation of an electric radiator fan motor 16 when a key switch 17 is turned on. The apparatus includes a main controller in the form of a microcomputer 6 for controlling the motor. A reset element 5 operates to reset the main controller for a predetermined time after the key switch is turned on. An auxiliary controller 9 controls the motor in place of the main controller when the main controller is abnormal. A switch 8 is provided for performing switching between a first condition in which the motor is controlled by the main controller and a second condition in which the motor is controlled by the auxiliary controller. An abnormality detector 7 detects an abnormality of the main controller and switches over the switch into the second condition when there is an abnormality of the main controller. An AND gate 10 is provided for disabling the output of the auxiliary controller during the time when the main controller is reset by the reset element.

6 Claims, 3 Drawing Sheets

CONTROL APPARATUS FOR A VEHICLE FOR CONTROLLING A DEVICE MOUNTED THEREON

BACKGROUND OF THE INVENTION

This invention relates to a control apparatus a vehicle for controlling a device mounted thereon.

FIG. 4 shows a typical example of a known control apparatus for a vehicle which includes a temperature sensor 1 mounted on a radiator (not shown) of a vehicle, and a control unit, generally designated by reference numeral 14, for controlling, based on the output of the temperature sensor 1, the operation of a device 16 mounted on the vehicle, the device 16 being in the form of an electric fan motor for air cooling the radiator. The control unit 14 has a first input terminal 2 connected to the temperature sensor 1, a second input terminal 3 connected through a key switch 17 to a DC power source 18 such as a battery, and an output terminal 13 connected to a relay 15 which is connected to the electric fan motor 16 and a node between the second input terminal 3 and the key switch 17. The control unit 14 further includes a main controller 6 in the form of a microcomputer connected to the first input terminal 2 and to the second input terminal 3 through a reset means 5 in the form of a power-on reset element, an abnormality detecting means 7 connected to the microcomputer 6 for detecting an abnormality thereof, an auxiliary controller 9 for controlling the electric fan motor 16 in place of the microcomputer 6 when it is abnormal, a switching means 8 having input terminals connected to the microcomputer 6, the abnormality detecting means 7 and the auxiliary controller 9 and an output terminal connected through a transistor 12 to the output terminal 13 of the control unit 14. The transistor 12 has a base connected through a resistor 11 to the output terminal of the switching means 8, an emitter connected to ground and a collector connected to the output terminal 13. A resistor 4 has one end thereof connected to a 5 volt internal power supply of the control unit 14 and the other end thereof connected to a node between the first input terminal 2 and the microcomputer 6.

With the conventional control apparatus as constructed above, when coolant water in the unillustrated radiator exceeds a prescribed level during the normal operation of the microcomputer 6, the microcomputer 6 senses this situation from the output of the temperature sensor 1 and generates an output which is fed through the resistor 11 to the base of the transistor 12 to turn it on. As a result, the relay 15 is turned on to connect the electric fan motor 16 to the DC power source 18 through the key switch 17 so that the fan motor 16 begins to generate air streams for cooling the radiator. On the other hand, when the microcomputer 6 is abnormal, the abnormality detecting means 7 detects this situation and generates an output to the switching means 8 which is thereby switched over such that the connection between the microcomputer 6 and the transistor 12 is interrupted and instead the auxiliary controller 9 is connected to the transistor 12. As a result, the fan motor 16 is thereafter controlled by the auxiliary controller 9 through the relay 15.

With the above-described conventional control apparatus, however, the abnormality detecting means 7 serves to detect whether the microcomputer 6 is normal or abnormal and, on the other hand, the power-on reset means 5 operates to reset, upon the turning on of the key switch 17, the microcomputer 6 for a predetermined time after which it begins to operate normally. Accordingly, the abnormality detecting means 7 detects an abnormality of the microcomputer 6 at the starting period thereof in addition to the case in which the microcomputer 6 is in fact abnormal. Thus, at the starting time of the microcomputer 6, the switching means 8 is switched over by the abnormality detecting means 7 into a condition in which the auxiliary controller 9 is connected to the relay 15, thereby driving the electric fan motor 16. As a result, when the key switch 17 is turned on by the driver of a vehicle on which the control apparatus is installed, the fan motor 18 is driven to operate for a predetermined period of time which is set by the power-on reset means 5, thus giving rise to an uncomfortable sensation on the part of the driver.

SUMMARY OF THE INVENTION

In view of the above, the present invention is intended to obviate the above-described problem of the known control apparatus for a vehicle, and has for its object the provision of a novel and improved control apparatus for a vehicle which is able to prevent an unnecessary operation of a device such as an electric fan motor mounted on the vehicle so as not to give any uncomfortable sensation to the driver at the time when the key switch is turned on.

In order to achieve the above object, according to the present invention, there is provided a control apparatus for a vehicle for controlling a device mounted thereon, the apparatus comprising:

a main controller for controlling the device;

reset means for resetting the main controller for a predetermined time after a key switch of the vehicle is turned on;

an auxiliary controller for controlling the device in place of the main controller when the main controller is abnormal;

switching means for performing switching between a first condition in which the device is controlled by the main controller and a second condition in which the device is controlled by the auxiliary controller;

means for detecting an abnormality of the main controller and switching over the switching means into the second condition when there is an abnormality of the main controller; and disabling means for disabling the output of the auxiliary controller during the time when the main controller is reset by the reset means.

Preferably, the main controller is a microcomputer, and the disabling means comprises an AND gate which has a first input terminal connected to the reset means, a second input terminal connected to the switching means and an output terminal connected to the device.

The above and other objects, features and advantages of the present invention will become apparent from the detailed description of a preferred embodiment of the invention taken in conjunction with the accompanying drawings.

BRIEF DESCRIPTION OF DRAWINGS

The identical parts throughout the drawings are designated by the same symbols.

DESCRIPTION OF THE PREFERRED EMBODIMENT

An embodiment of the present invention will now be described in detail with reference to the accompanying drawings.

Figure 1:
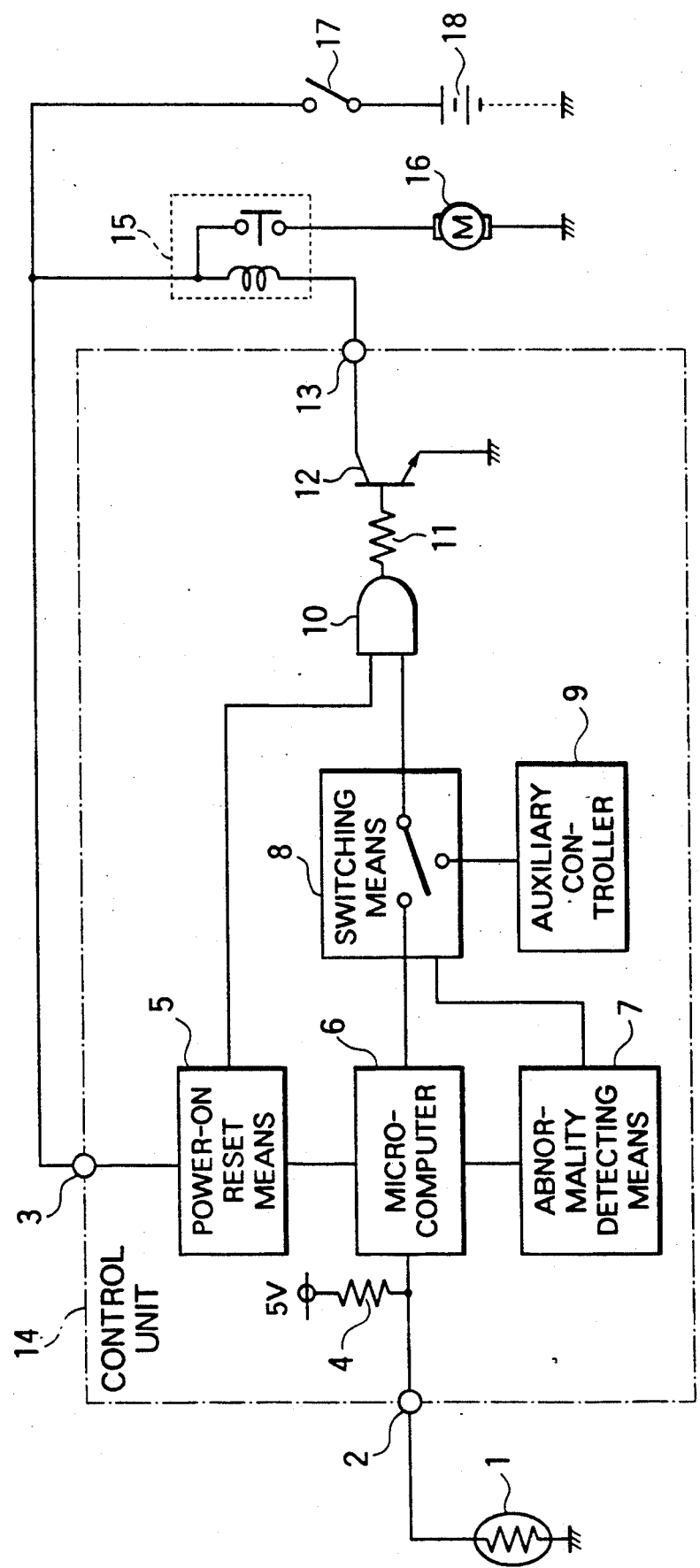
FIG. 1 is a block diagram showing the general construction of a control apparatus for a vehicle in accordance with the present invention.
Figure 4:
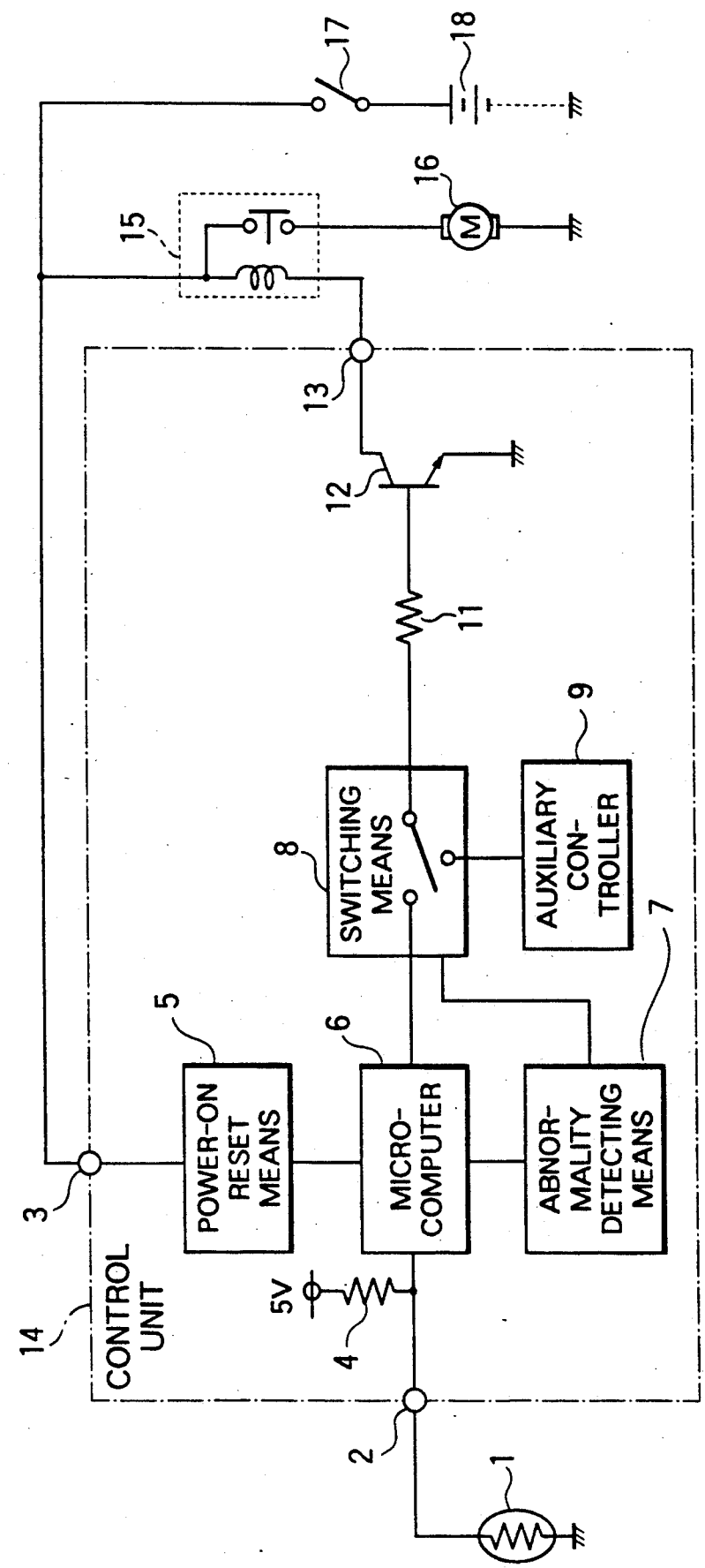
FIG. 4 is a view similar to FIG. 1, but showing a known control apparatus for a vehicle.

FIG. 1 illustrates a control apparatus for a vehicle constructed according to the present invention. In FIG. 1, the apparatus illustrated is substantially similar in construction to the known apparatus as referred to before with reference to FIG. 4 except for the provision of a disabling means 10 for disabling the output of the auxiliary controller 9 during the time when the main controller 6 is reset by the reset means 5. The disabling means 10 comprises an AND gate which has a first input terminal connected to the power-on reset means 5, a second input terminal connected to the output terminal of the switching means 8 and an output terminal connected to the base of the transistor 12 through the resistor 11.

Figure 2:
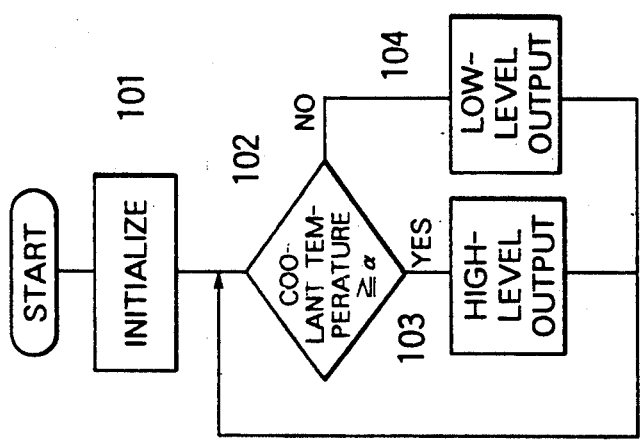
FIG. 2 is a flow chart showing the operational process of the control apparatus of FIG. 1.
Figure 3:
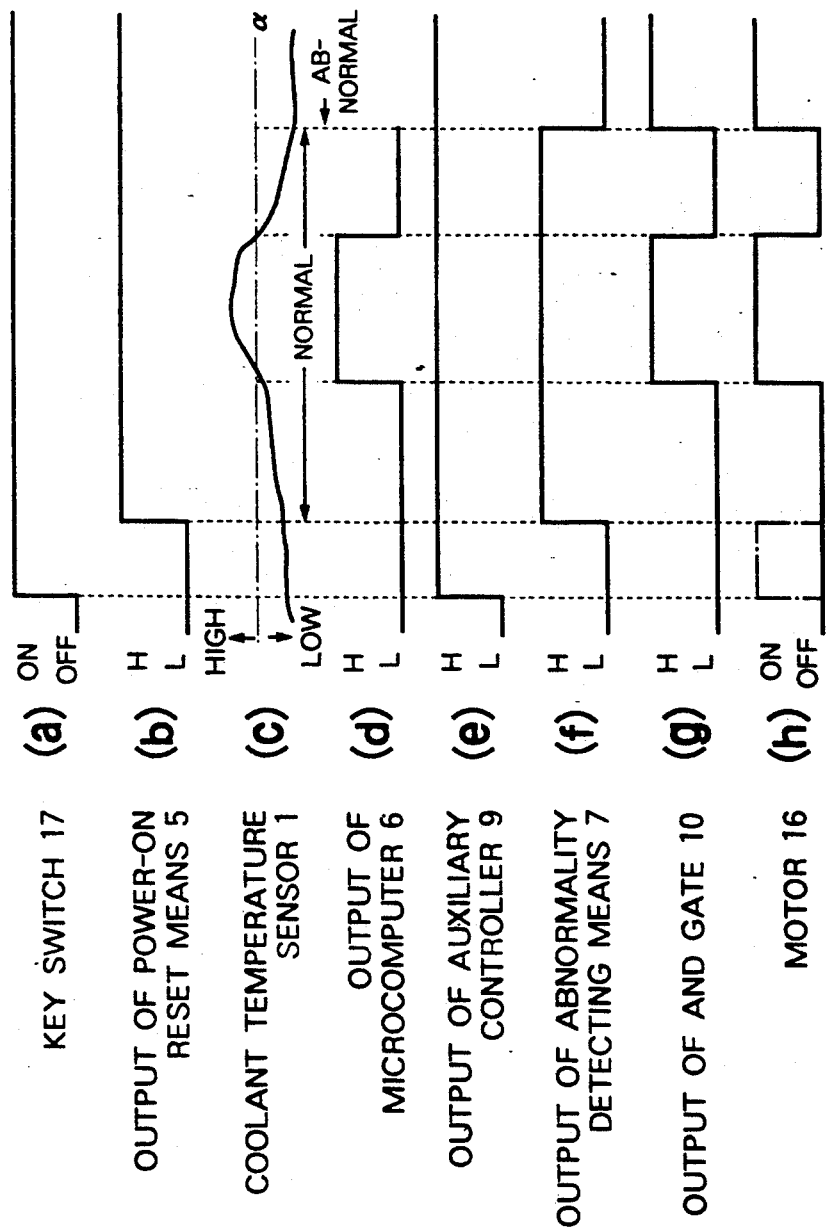
FIGS. 3a-3h are timing charts showing the operational timings of various elements of FIG. 1.

Now, the operation of the control apparatus for a vehicle as constructed above will be described in detail while referring to the flow chart of FIG. 2 and the timing chart of FIG. 3. First, when the key switch 17 is turned on by the driver of the vehicle, as shown by (a) in FIG. 3, the output of the power-on reset means 5 is held at the low level for a predetermined time as shown by (b) in FIG. 3, thereby resetting the microcomputer 6. At this time, the abnormality detecting means 7 detects the inoperative condition of the microcomputer 6 and generates a low-level output (i.e., an abnormality detection output), as shown by (f) in FIG. 3, which is input to the switching means 8. As a result, the switching means 8 is switched over by the low-level output of the abnormality detecting means 7 to connect the auxiliary controller 9, which constantly has a high-level output, as shown by (e) in FIG. 3, to the base of the transistor 12. Due to the output of the power-on reset means 5 remaining low, however, the output of the AND gate 10 is still held at the low level, as shown by (g) in FIG. 3, so that the transistor 12 is held non-conductive, maintaining the relay 15 in an off state. As a consequence, the electric fan motor 16 is in a deenergized state, as shown by (h) in FIG. 3 in which the alternative long and short dashed line indicates the operation of the aforesaid known control apparatus of FIG. 4. Subsequently, when the resetting of the power-on reset means 5 is released and the output thereof is changed into a high level, the microcomputer 6 begins to operate and hence the output of the abnormality detecting means 7 is turned into a high level indicative of the normal operation of the microcomputer 6, placing the switching means 8 into a condition in which the microcomputer 6 is connected to the base of the transistor 12. On the other hand, the resistance of the temperature sensor 1 connected to the first input terminal of the control unit 14 changes in dependence upon the temperature of the coolant water in the unillustrated radiator of the vehicle, so that the output voltage of the internal power supply as divided by the temperature sensor 1 and the resistor 4 is input to the microcomputer 6. Accordingly, the microcomputer 6 is initialized in Step 101 in FIG. 2, and then in Step 102, it determines whether the temperature of the coolant water (i.e., the input voltage from the first input terminal 2 to the microcomputer 6) is equal to or higher than a prescribed level α. When the water temperature becomes equal to or higher than the prescribed level α, as shown by (c) in FIG. 3, the microcomputer 6 generates a high-level output in Step 103 in FIG. 2. In this connection, as the output of the power-on reset means 5 is also high, the output of the AND gate 10 becomes high so that the transistor 12 is made conductive to turn the relay 15 on. As a result, the electric fan motor 16 is energized to start cooling the radiator. On the other hand, if the water temperature is lower than the prescribed level α, then in Step 104, the output of the microcomputer 6 becomes low, thereby turning off the transistor 12. Further, in cases where there takes place an abnormality in the microcomputer 6, the output of the abnormality detecting means 7 becomes low so that the switching means 8 is switched over to connect the auxiliary controller 9 to the base of the transistor 12. As the output of the auxiliary controller 9 is always high and the output of the power-on reset means 5 is also high, the AND gate 10 generates a high-level output, thus driving the fan motor 16 irrespective of the temperature of the coolant water.

As described in the foregoing, according to the present invention, when the microcomputer 6 is in a reset state, the output of the auxillary controller 9 is disabled so that there is no possibility of the electric fan motor 16, which is to be controlled by the control unit 14, being driven to operate by means of the microcomputer 6 as well as the auxiliary controller 9, thus preventing the driver of the vehicle from having an uncomfortable sensation due to an unnecessary operation of the fan motor 16.

What is claimed is:

1. A control apparatus for a vehicle for controlling a device (16) mounted thereon, the apparatus comprising:
    a) a main controller (6) for controlling the device in an on-off manner;
    b) reset means (5) for initially resetting the main controller for a predetermined time period after a key switch (17) of the vehicle is turned on, said resetting causing the main controller to appear to be functioning abnormally during the predetermined time period;
    c) an auxiliary controller (9) for controlling the device in a continuously on manner in place of the main controller when the main controller is abnormal;
    d) switching means (8) for performing switching between a first position in which the device is controlled by the main controller and a second position in which the device is controlled by the auxiliary controller;
    e) means (7) for detecting an abnormality of the main controller and switching over the switching means into the second position when an abnormality of the main controller is detected; and
    f) disabling means (10) for disabling the output of the auxiliary controller during the predetermined time period when the main controller is being reset by the reset means and appears to be functioning abnormally, to thereby prevent the device from being controlled in a continuously on manner during said predetermined time period.

2. An control apparatus according to claim 1, wherein the main controller is a microcomputer.

3. An control apparatus according to claim 1, wherein the disabling means comprises an AND gate which has a first input terminal connected to the reset means, a second input terminal connected to the switching means and an output terminal connected to the device.

4. A control apparatus according to claim 3, wherein the output terminal of the AND gate is connected to the device through a transistor (12) and a relay (15).

5. A control apparatus according to claim 1, further comprising a temperature sensor (1) for sensing the temperature of a coolant which cools an engine of the vehicle and generating an output when the sensed temperature of the coolant is above a prescribed level, the main controller being operated to generate an output based on the output of the temperature sensor.

6. A control apparatus according to claim 5, wherein the device comprises an electric motor for driving a radiator cooling fan.

* * * * *